United States Patent

[11] 3,555,178

[72] Inventors Homer A. Humiston
Arnold;
Fitz-Hugh B. Marshall, Ellicott City, Md.
[21] Appl. No. 424,577
[22] Filed Jan. 11, 1965
[45] Patented Jan. 12, 1971
[73] Assignee Westinghouse Electric Corporation
East Pittsburgh, Pa.
a corporation of Pennsylvania

[54] OPTICAL IMAGING AND RANGING SYSTEM
8 Claims, 20 Drawing Figs.

[52] U.S. Cl. .......... 178/6.8, 178/7.2, 356/5
[51] Int. Cl. .......... H04n 5/30
[50] Field of Search .......... 343/6TV, 6, 12, 17; 88/1; 178/7.6, 6.8, 7.2

[56] References Cited

UNITED STATES PATENTS 2,510,070 6/1950 Cawein .......... 178/7.6
3,019,292 1/1962 John .......... 178/6.8
3,067,281 12/1962 LaPierre .......... 178/6.8
3,180,205 4/1965 Heppe .......... 178/6.8

*Primary Examiner*—Richard Murray
*Assistant Examiner*—Joseph A. Orsino, Jr.
*Attorneys*—F. H. Henson, E. P. Klipfel and D. Schron

ABSTRACT: A field of view is scanned with a flying spot scanner projecting radiation of a certain wavelength. At the same location, radiation reflected back from the field of view is received by an image dissector tube having a photosensitive surface responsive to the wavelength of radiation being transmitted, to form an electron image. The electron image is scanned over a small aperture of an apertured plate member in the image dissector tube at a rate synchronized with a rate of scanning of the flying spot scanner. The scanning in the image dissector tube may, in effect, start at various predetermined times after the scanning of the flying spot scanner so that fields of view at correspondingly different ranges may be examined. The output of the image dissector is fed to a TV monitor for viewing purposes.

WITNESSES:

John L. Chopp

James T. Young

INVENTORS
Homer A. Humiston and
Fitz-Hugh B. Marshall
BY
Dean Schron
ATTORNEY

PATENTED JAN 12 1971

3,555,178

OPTICAL IMAGING AND RANGING SYSTEM

This invention, in general, relates to electro-optical systems, and more in particular to an optical imaging system particularly well adapted for scanning a scene with light, either visible or invisible, and receiving and sensing radiation reflected from the scene for purposes of visual interpretation.

In both the military and commercial fields, various electro-optical imaging systems have been proposed utilizing a flying spot of light produced by a flying spot scanner for scanning a desired field of view. Any target object within that field of view reflects the projected light, with the intensity of the reflections varying in accordance with the reflectance of the target. The reflected light is picked up by a photoelectric cell which translates the modulations of the reflected light into an electrical signal generally utilized to control a visual display, in most instances, a television monitor. With the flying spot scanner, it is necessary that the viewed scene be dark, except for illumination from the flying spot. Any continuous ambient illumination of the scene, as by skylight or illuminating floodlights, will cause reflected light from all parts of the scene to be received continuously by the photoelectric pickup, degrading or destroying the picture viewed on the monitor. In greater detail, the ambient illumination causes a large current of photoelectrons, and the statistical variation constitutes noise which degrades or overrides the signal current relating to reflectance from the flying spot.

For military counter measure purposes a well-aimed beam of light directed toward the photoelectric pickup would essentially jam the entire system. The action on the photocell is the same as from general ambient reflection. In this case, a very intense continuous light from one small part of the field of view causes a large photocurrent unrelated to the reflected return from the flying spot.

For outdoor or underwater applications not only is ambient light a factor in preventing proper operation but the additional problem of backscatter must be taken into account. Backscatter occurs when the projected light reflects to the receiver off particles in the intervening path. Backscatter often occurs under hazy or foggy atmospheric conditions. For underwater applications it is apparent that backscatter is a constant problem. Any scatter light reaching the photoelectric pickup cell is unwanted light. Its intensity does not relate to scene reflectance and therefore the monitor picture of the scene is degraded.

It is therefore one object of the present invention to provide an optical imaging system which is relatively insensitive to ambient light.

A further object is to provide an optical imaging system which is relatively insensitive to jamming techniques.

It is a further object to provide an optical imaging system which is relatively insensitive to backscatter light.

In the prior art imaging systems utilizing the flying spot scanner, the photoelectric pickup cell receives light reflected from any object which is scanned. The radiation reflected back to the photoelectric pickup cell may occur from an object near the flying spot scanner as well as from an object at a considerable distance therefrom. Since the reflected light from a distant object is received at a later time than from a closer object, a form of parallax, or distortion, occurs in the picture as reproduced on the monitor. Consider a near and far object actually in line with each other as seen normally by an observer. If the flying spot scans from left to right, the reflection from the near object will return sooner than the reflection from the far objects. The near object will register on the monitor to the left of the far object. The separation observed on the monitor is precisely related to the range difference of the two objects, and can be used as a means for determining range. However, in the prior art imaging system it is impossible to determine range difference this way without some further knowledge, such that the two objects are actually in line. Otherwise, the apparent displacement of the image of the near object might be due instead only to actual displacement, with both objects at the same far distance.

It is therefore a further object of the present invention to provide an optical imaging system which is capable of estimating ranges of targets within the field of view.

Yet another object is to provide an optical imaging system which will "see" targets only within a predetermined "range window".

A further object is to provide an optical imaging system which will see targets within a predetermined range window, which range window may be selectively varied.

Briefly, in accordance with the above objects, the broad concept of the invention comprises a light transmitter to provide a scanned illumination of a field of view such that at any instant only one spot to the field of view is illuminated. Matching this scanned illumination is a scanned viewer positioned adjacent the transmitter for selectively receiving reflected light from any object in the field of view and having a scanning rate synchronized with the scanning rate of the light source so that the receiver responds selectively to the spot or an object illuminated by the transmitter and substantially to no other light.

The objects and the basic concept are accomplished in the present invention one illustrative embodiment of which comprises a flying spot produced by a phosphor having an extremely short persistence time, with projection optics for projecting the flying spot into a light beam which scans a field of view. The scanned receiver comprises an image dissector tube which includes a photosensitive surface responsive to the wavelength of light being transmitted to form an electron image. This electron image is then scanned over a small aperture of an apertured member, at a rate synchronized with the rate of scanning of the flying spot scanner. Behind the aperture is located an electron multiplier the electrical signal output of which is fed to a utilization device such as a TV-type monitor. The relative angular positioning between the transmitter and receiver may be adjusted in various ways to correspond to the time for light to make the round trip from the transmitter to an object back to the receiver. In greater detail, although the receiver scan is synchronized with the transmitter scan, a lag must be introduced to allow for the light to make the round trip. This lag may be adjusted to accommodate different ranges. For a given lag time, only objects at one particular range will be sensed and presented on the monitor. The light return from a nearer object will not be imaged. The system is "blind" to objects and extraneous light not in the selected range. Thus the system allows determination of the range of an object, by the lag necessary to bring its image into synchronism for appearing on the monitor.

The above stated, as well as other objects, features and advantages of the present invention will be apparent upon a reading of the following detailed specification taken in conjunction with the drawings, in which.

Figure 4A:
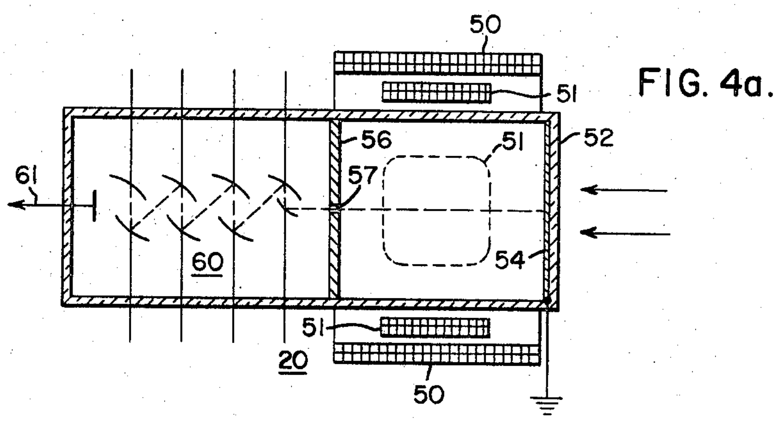
Figures 3A, 4B:
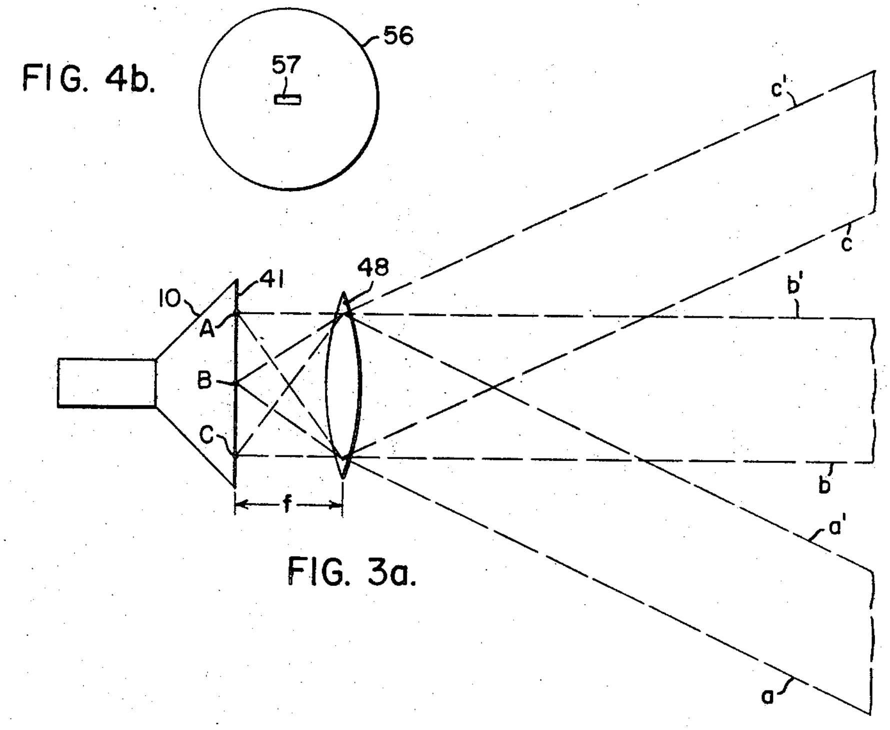
Figure 3B:
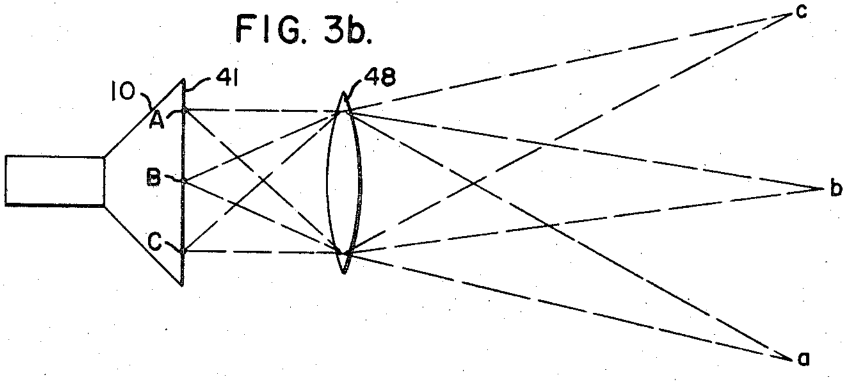
Figure 5:
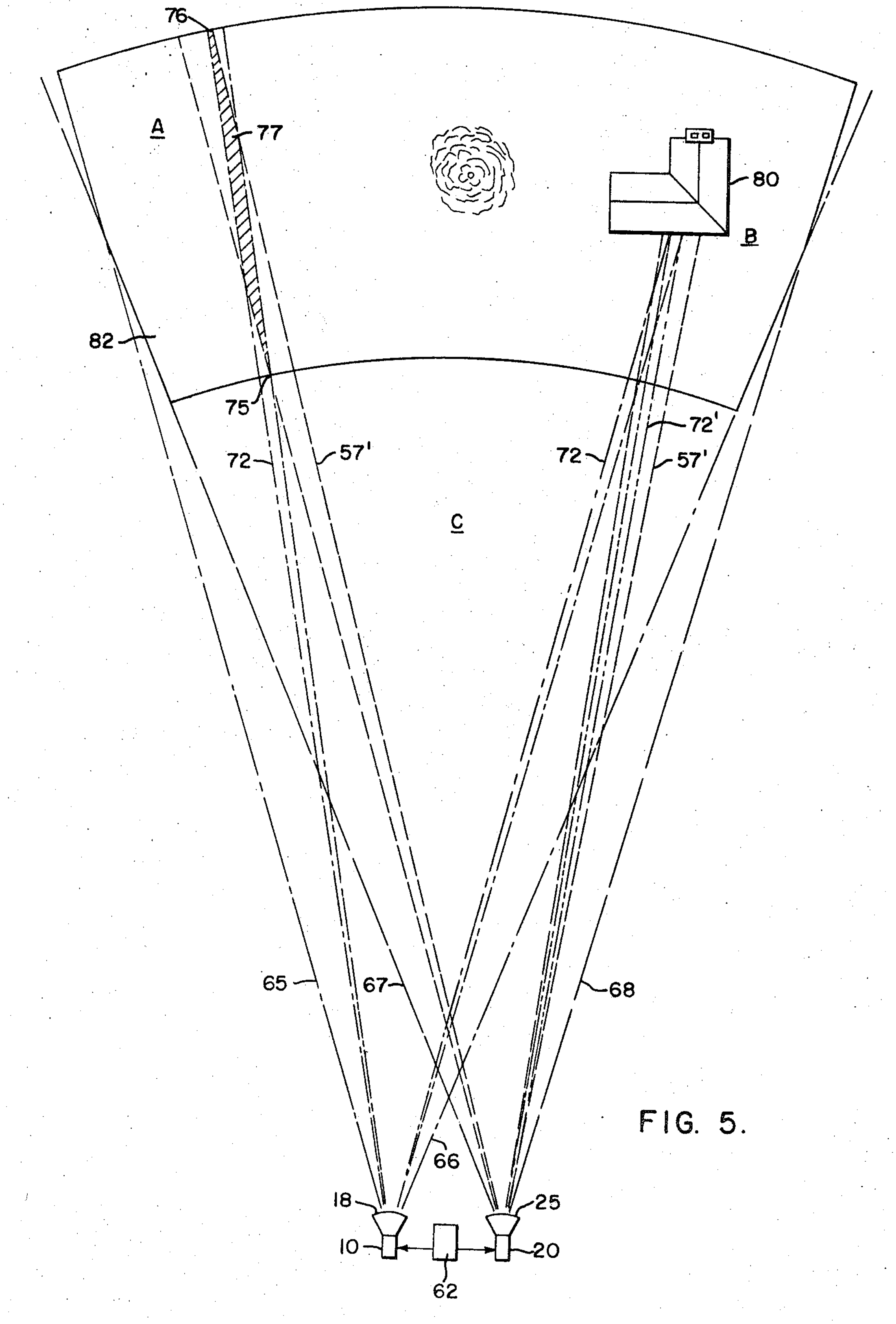
Figure 7A:
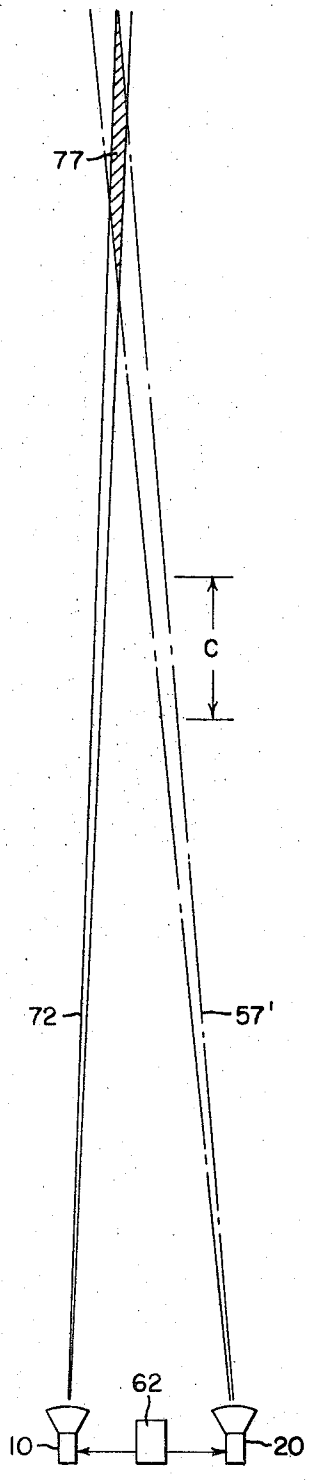
Figure 7B:
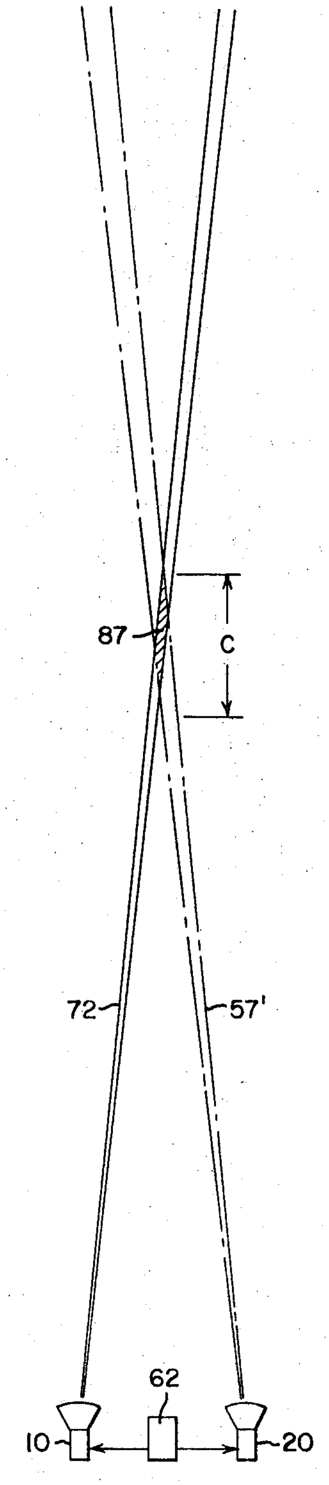
Figure 8A:
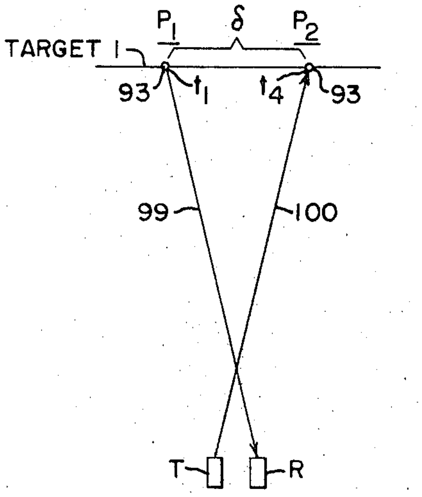
Figure 8B:
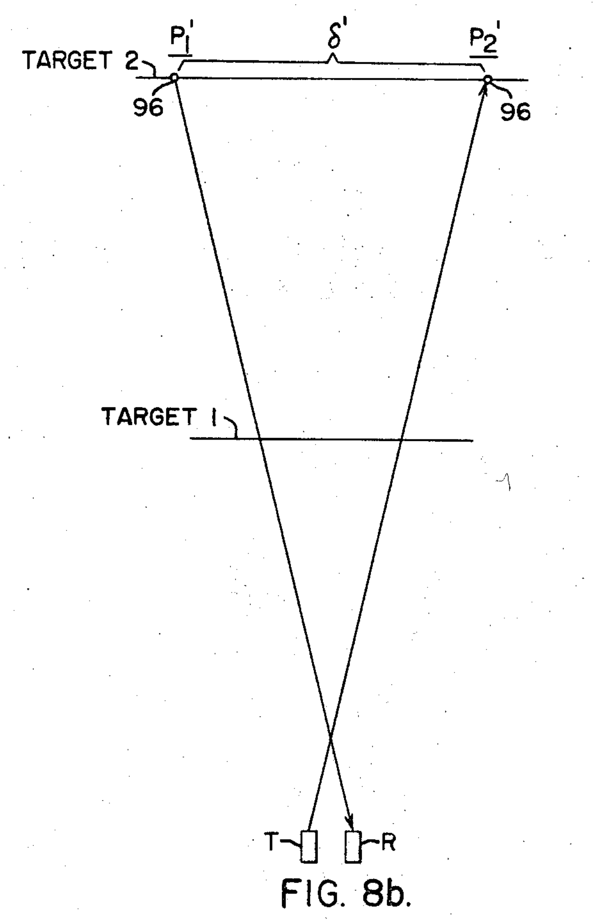

FIG. 3*a* and 3*b* illustrates basic optics for a better understanding of the present invention;

FIG. 4*a* illustrates, in section, an image dissector tube;

FIG. 4*b* illustrates the apertured plate utilized in the image dissector tube of FIG. 4*a*;

FIG. 5 illustrates a top view of a scene being scanned by the flying spot scanner beam;

FIGS. 6*a* to 6*g* illustrate the scanning operation of the image dissector tube;

FIGS. 7*a* and 7*b* illustrate the "range window" concept;

FIGS. 8*a* and 8*b* illustrate a time-delay ranging operation; and

Figure 9:
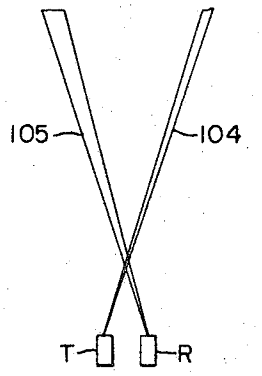
Figure 10:
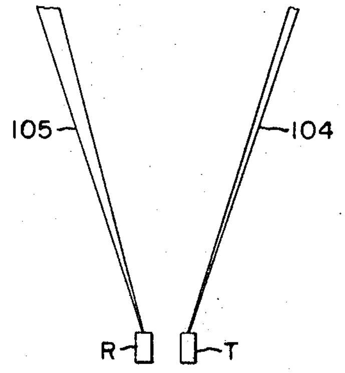

FIGS. 9 and 10 serve to illustrate a positioning of the transmitter and receiver of the present invention.

Figure 1:
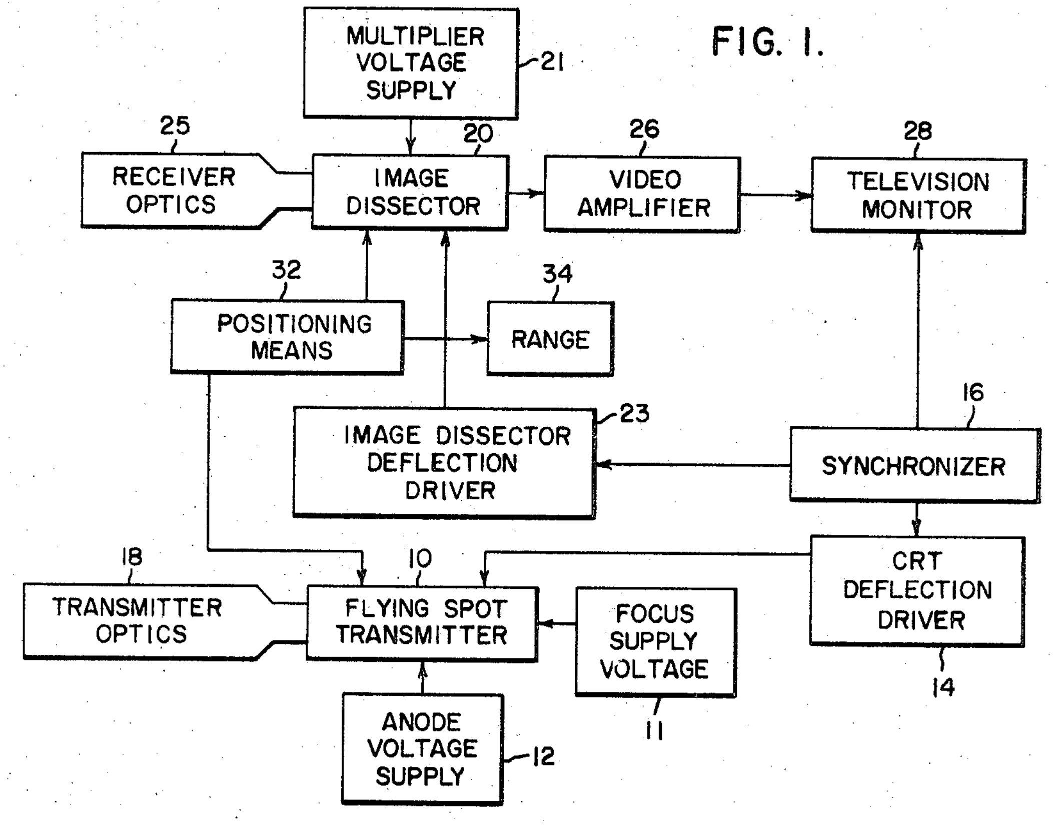
FIG. 1 is a block diagram of a preferred embodiment of the present invention.

Referring now to FIG. 1, there is illustrated in block diagram form an operative system in accordance with the present invention. In order to produce a flying spot of light there is provided an optical transmitter in the form of flying spot scanner 10 having focus and anode voltage supplies 11 and 12 respectively as is well known to those skilled in the art. In order to provide a scanning beam, deflection driver means 14 is provided which in turn is controlled by the synchronizer 16. Associated with the flying spot transmitter 10 are transmitter optic means 18 positioned relative to the transmitter for projecting the moving spot produced thereby over a desired field of view.

The receiver portion of the system includes a scanning receiver in the form of image dissector 20 having an appropriate photomultiplier voltage supply means 21 and an image dissector deflection driver means 23 which is controlled by the synchronizer 16 as is the cathode ray tube deflection driver means 14. In order to focus properly any reflected light radiation onto the image dissector 20 there is provided suitable receiver optic means 25. The output signal produced by the image dissector 20 is amplified by the video amplifier means 26 and fed to the monitor means in the form of a conventional television viewer 28 the scanning rate of which may be controlled by the synchronizer 16 in order to scan at the same rates as the flying spot transmitter 10 and the image dissector 20. In order to vary the relative angular positioning of a transmitted beam with respect to the reflected beam received by the image dissector 20 there is provided positioning means 32. Several positioning adjustments must be made. Any one of them may usually be made in alternate ways. Those described herein are examples. The flying spot transmitter 10 and the image dissector 20 must be aligned rotationally. One way is simple physical rotation. Further, they must be aligned translationally in two directions, translational motion being along an axis and rotational motion being around an axis. This also may be accomplished by physical alignment. Alternatively, these adjustments may be accomplished electrically within limited ranges. Finally, the time lag must be adjusted. Ideally, this is done electronically, but within a limited range, a translational motion in the pointing, in the scan direction, may accomplish the same result.

In principle, the range is determinable from the known speed of light and the observed lag when all these adjustments have been made. In practice, it is necessary to position the system with reasonable accuracy and then to calibrate the system calibrate for range determination, at least to the extend of determining the calibration setting for one known range. Since timing measurements can be made with high accuracy by the ranging circuit 34 for determining differences of time lag for objects at different distances, other distances may normally be expected to be correct once a single distance calibration has been accurately set.

Figure 2:
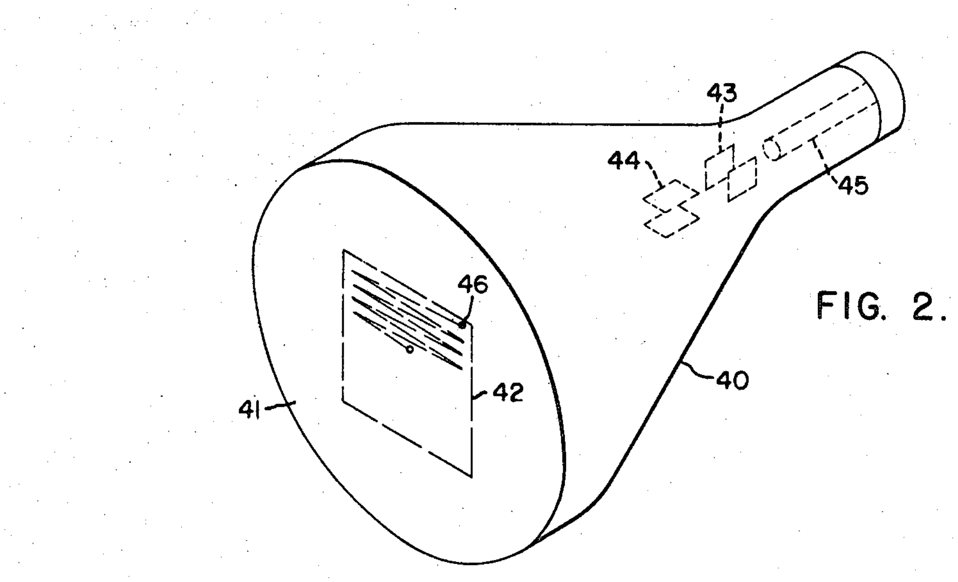
FIG. 2 illustrates a preferred type of flying spot scanner transmitter which may be utilized in the present invention.

In FIG. 2 there is shown a cathode ray tube 40 forming the active part of the flying spot transmitter 10 of FIG. 1. A raster 42 is formed on the substantially flat face 41 of the cathode ray tube 40 by the scanning spot 46, caused to move in the direction shown, by means of deflection plates 43 and 44 in a manner well known to those skilled in the art. The cathode ray gun 45 produces and focuses the thin pencil beam of electrons which bombard the face 41 to form the flying spot 46. The face 41 has on the inside surface thereof a phosphor having a very short persistence, and if the system is to be utilized in applications where it is desired to have an invisible light beam, the phosphor should emit radiation in the invisible portion of the spectrum. One type of phosphor which approaches these requirements is calcium magnesium silicate, known commercially as P-16, which has a relatively short persistence of approximately one-tenth of a microsecond and emits radiation primarily in the ultraviolet region of the spectrum. This phosphor has already been developed to have relatively high efficiency and is available commercially. Obviously other phosphors covering a wide spectral range, visible or invisible may be utilized. In FIG. 2, the raster 42 is seen to be centered on the face 41 of the cathode ray tube 40. By properly applied voltages to the deflecting means 43 and/or 44 the raster 42 may be moved either up or down and/or right or left to thus effect an electrical repositioning of the scanning beam produced by the flying spot 46.

Although in the preferred embodiment shown herein a cathode ray tube has been illustrated as the flying spot scanner, it is to be understood that other flying spot systems may be utilized. These systems incorporate for example, laser light beams or other types of light beams scanned by electrical or mechanical means. For example, a light source and focusing optics fixed in position can be used with rotating mirrors to accomplish scanning of the spot of light over the scene, the basic concept being to provide a scanning spot of light over a field of view. Various types of scans may be utilized. By way of illustration the embodiment of the invention described herein will utilize a cathode ray tube with a beam deflection signal to cause a field of view to be scanned from left to right facing the scene. In the return from right to left the beam may be turned off. Among other apparent modifications, the scene may be scanned from top to bottom or vice versa, from right to left or both from left to right and right to left, with the receiver in all cases being synchronized with the transmitter. In order to better understand how the flying spot scans a field of view, reference should now be made to FIGS. 3*a* and 3*b*.

In FIG. 3*a* there is shown the face 41 of the flying spot transmitter 10 positioned at substantially the focal plane of lens 48. When the flying spot is at position A on the face 41 a beam of light is produced with its outermost rays *a* and *a'* shown. When the flying spot is at position B the beam produced therefrom is shown as having its outermost rays *b* and *b'* and when the spot is at position C a beam having its outermost rays *c* and *c'* is produced. Therefore it is seen that as the spot scans over the face of the cathode ray tube, a corresponding beam scans a field of view. For each spot position the emerging rays are here shown essentially parallel, as when focused for a very distant scene. It must be added that the emitting spot 46 on the cathode ray tube face 41 has finite spread and is thus not a perfect point source. Accordingly, the beam diverges slightly and results in a spot of finite width of the scene.

In FIG. 3*b* there is shown a situation wherein the distance to the scene is substantially less than infinite. For proper focus, the lens position is adjusted to a distance greater than the focal length from the cathode ray tube face 41. A similar focus adjustment must be made for the receiver 20 and receiver optics 25.

By way of example, a 500-line 6 cm. × 8 cm. rectangular raster might be used at the transmitter cathode ray tube 10. The spot diameter on the cathode ray tube face 41 would normally be about 6 cm./500 = .012 cm. This raster might be projected to a range of 1,000 meters to form at the scene a corresponding 500 line rectangular raster 60 meters × 80 meters (normal to the line of sight). The scanning spot diameter at the scene would then be 60 meters/500 = .12 meters or 12 cm. This falls within the purview of the good resolution comparable to that of the human eye, although object detail small in comparison to 12 cm. would not be resolved.

Since the phosphor has an extremely short persistence, the scanning spot on the scene fades according to this persistence time and an initial spot at the start of a line scan disappears in approximately one spot-width time.

In FIG. 4*a* there is shown in somewhat more detail the image dissector 20 of FIG. 1. The image dissector includes focusing and deflection means in the form of coils 50 and 51, and further includes a planar end wall 52 having a photosensitive surface 54 deposited thereon. The photosensitive surface 54 is responsive to the wavelength of the projected radiation from the flying spot transmitter and is operative to form an electron image in response to the reflected radiation received. The photosensitive surface 54 is such that there is no storage of information as is found in conventional television pickup tubes. This one storage feature is a factor in the elimination of response to scattered light. The electrons released from the photosensitive surface 54 forming an electron image are scanned across the aperture 57 in the plate 56. The scanning rate of the electron image is synchronized to be equal to the scanning rate of the flying spot scanner of FIG. 2. It is to be noted that scanning the image across the aperture is exactly equivalent to scanning the aperture over the image. The aperture 57 accepts electrons only from a small elemental area of any electron image formed and photomultiplier means 60, connected to suitable sources of potential, not shown, greatly amplifies the electron signal to provide an output signal on output lead 61 which signal is utilized to control the television monitor 28 (FIG. 1).

In FIG. 4*b* there is shown the plate member 56 having the aperture 57 therein. The specific size and shape of the aperture is dependent upon not only the optics system utilized but is also dependent upon the particular application and design parameters of the imaging system. As a first idealization, one may visualize that the image dissector aperture 57 exactly matches, in size and shape, the image of the flying spot. In practice however, it is generally desirable that the aperture 57 be somewhat larger to allow for some mismatches in the total system and to allow for a reasonable focal depth of viewing at the scene. In the embodiment of the invention described herein the aperture has a rectangular shape satisfactory dimensions of which may be .0762 cm. (.030 inches) by .0381 cm. (.015 inches) for an image dissector having a diameter of 11.43 cm. (4 ½ inches).

For a better understanding of the operation of the present invention reference should now be made to FIGS. 5 through 10.

In FIG. 5 there is shown a top view of the system of FIG. 1 including the flying spot transmitter 10 with the transmitter optic means 18 and the image dissector receiver 20 with its receiver optic means 25 and at the same location and adjacent to, the transmitter 10. The remainder of the system is represented generally by the block labeled 62. Assuming that a scene is scanned from left to right (as seen by a person facing the scene) FIG. 5 shows that the scanning beam may scan a sector within the angular limits defined by lines 65 and 66. In a typical system this sector may encompass approximately 40°. In a similar manner and dependent upon the receiver optics 25, the image dissector 20 will accept reflected radiation from a similar sector defined by lines 67 and 68. Just as the scanning beam scans within limits 65 and 66, the projection of the image dissector aperture 57 may be thought of to scan a field of view defined by the limits 67 and 68. For a better understanding of this latter concept reference should be made to FIGS. 6*a* through 6*g*.

Figure 6A:
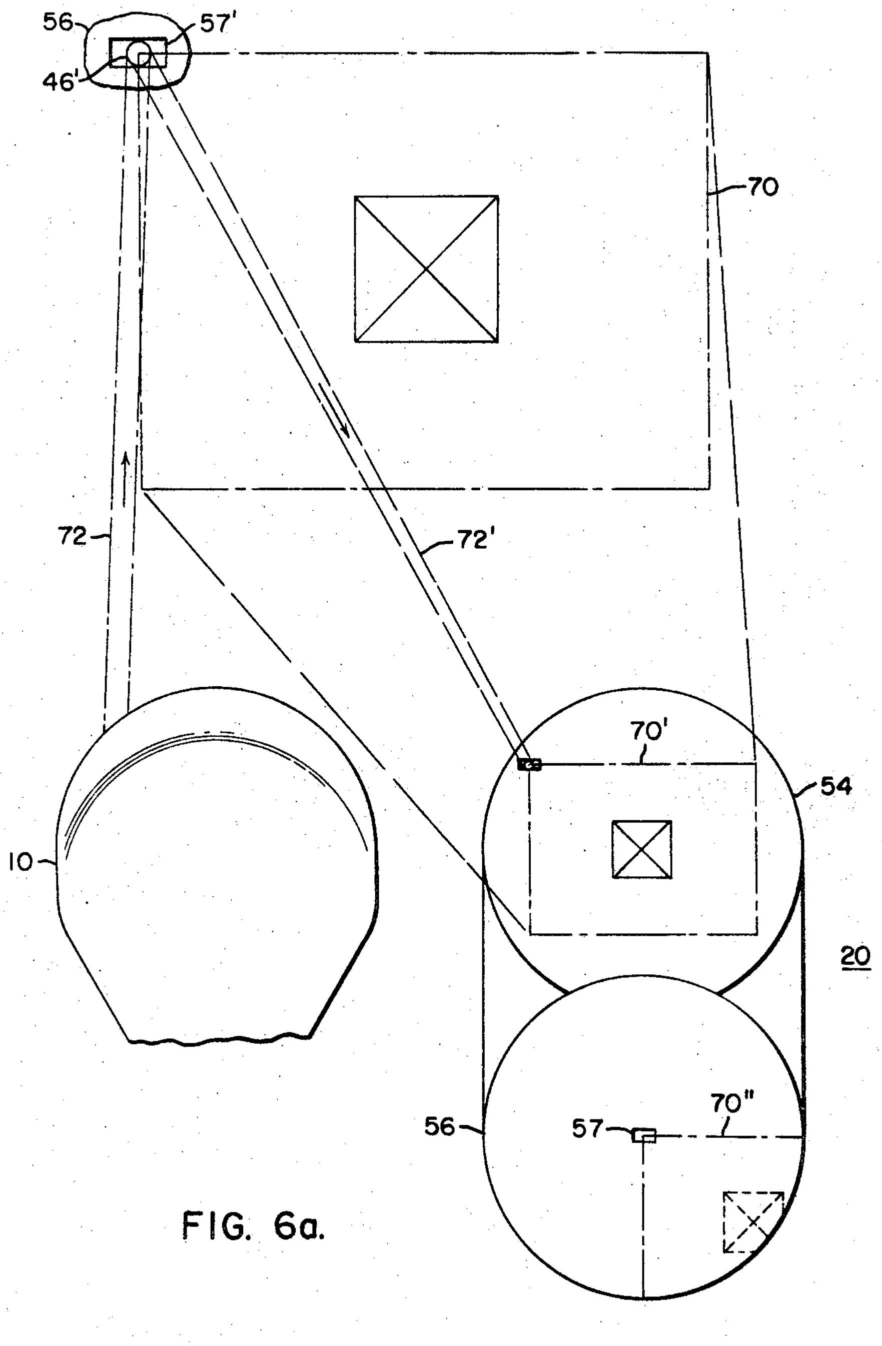
Figure 6B:
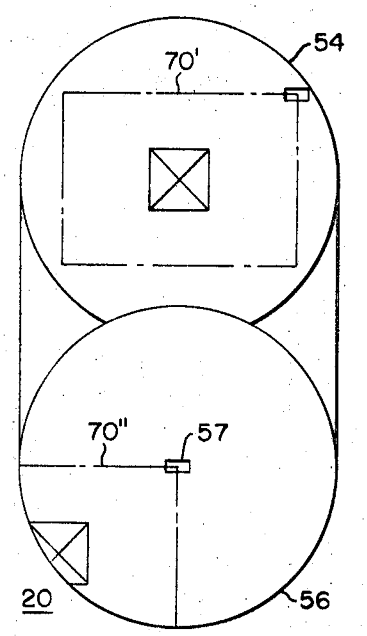
Figure 6C:
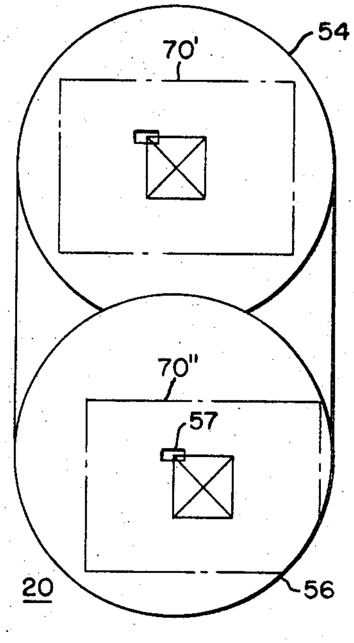
Figure 6D:
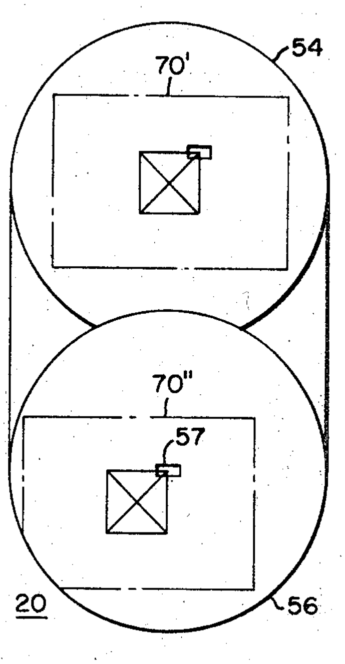
Figure 6E:
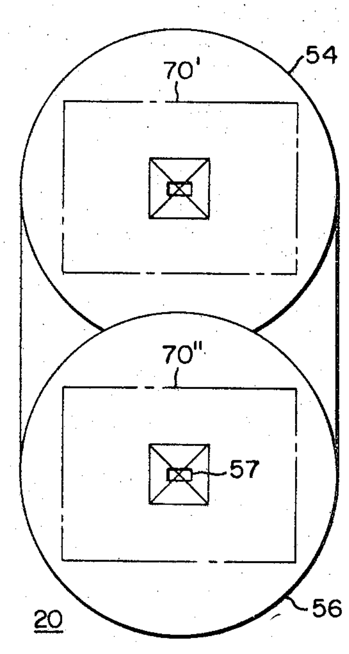
Figure 6F:
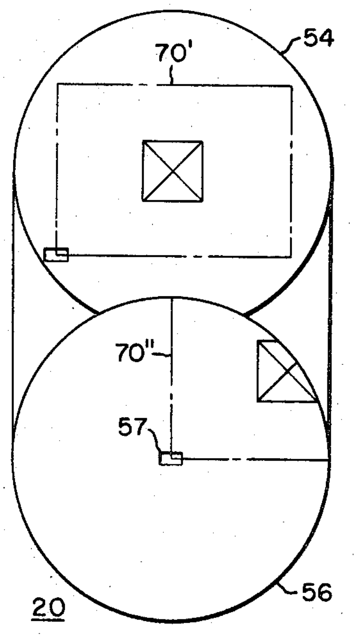
Figure 6G:
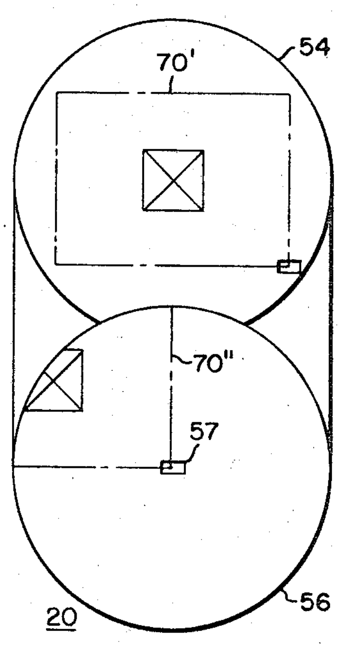

FIG. 6*a* shows the flying spot transmitter 10 for scanning a distant target 70 the picture of which will be picked up by the image dissector 20. It is to be noted that for purposes of clarity the optic systems, the photomultiplier means for the image dissector 20, and attendant electrical circuitry have been omitted. Assume that the target 70, if fully illuminated, forms an electron image 70' on the photosensitive surface 54 with the scanning and focusing electronics of the image dissector 20 causing a projected (and deflected) image 70'' to scan across the aperture 57. FIGS. 6*a* through 6*g* have been drawn assuming that the human eye is able to see the electron image 70' and the projected image 70''; it is to be understood however that at any instant of time, in the present invention, only one spot of the target will be illuminated by the scanning beam 72 such that the reflected beam 72' at any instant of time will cause only an elemental portion of the target 70 to be reproduced as an electron image. In FIG. 6*a*, the scanning of the projected image 70'' starts at the upper left-hand corner thereof. FIG. 6*b* shows the relative deposition of the projected image 70'' after a single scan; the remaining figures 6*c* through 6*g* show the projected image 70'' at various other points in the scanning process. After the lower right-hand corner of the projected image 70'' has been sampled, the scanning again begins at the upper left-hand corner. From a relative standpoint, the electron image 70' remains stationary while it projected image 70'' is scanned across the aperture 57. This operation is the same as through the aperture 57 were scanned across the electron image 70'. Since the electron image 70' is identically proportional to the target 70, the relative scanning of the aperture 57 across the electron image 70' would be similar to having the projected aperture scan the actual target 70. This situation is represented on the target 70 by the numeral 57' (a small portion of plate 56 being shown). The size of the projected aperture 57' on the actual target 70 would be a function of the aperture size, the receiver optic means 25, and general design considerations. The concept of a projected aperture scanning a field of view significantly aids in an understanding of the present invention. Basically, there is a 1:1 correspondence with: the aperture 57 relative to the projected image 70''; and the projected aperture 57' relative to the target 70. If the scanning beam 72 produces a spot 46' on the target 70 and if the projection 57' of the aperture encompasses the area in which the spot 46' hits, then the image dissector 20 will be operable to produce a usable signal since the real aperture 57 will "see" the scanning spot on the target at that instant (plus a small time delay as will become apparent) and the photomultiplier means 60 located behind the aperture 57 will amplify the signal thus received. As the scanning beam 72 scans from left to right, and if the projected image 70'' is scanned at the same rate therewith, then the spot 46' will always be within the projected aperture area 57' and the target therefore may be portrayed on the TV-monitor in accordance with the signals provided by the image dissector 20. If in FIG. 6*a*, the spot 46' falls without the projection 57' of the aperture, then the image dissector 20 would not see that portion of the target illuminated by the spot. It is essential therefore that proper operation requires an exact synchronism with the scanning beam 72 and the "scanning aperture 57" (in actuality, the scanning rate of the projected image 70'').

Referring again to FIG. 5 the numeral 57' therefore represents the projected aperture of the image dissector 20. It is seen that at position A the scanning beam 72 intersects the projected aperture 57' from point 75 to point 76, defining an acceptance area 77. Any object within the acceptance area 77 will be illuminated by the scanning beam 72 and will be "seen" by the image dissector 20. The positions shown for the scanning beam 72 and the scanning aperture 57' are respectively, the direction of the transmitter beam at the time particular energy leaves the transmitter 10, and the direction of the scanning aperture 57' at the time any reflected portion of the said energy arrives at the image dissector 20, the time difference between transmission and reception being related to the time for the energy to reach the acceptance area 77 and proceed back to the image dissector 20. FIG. 5 therefore shows the projection of the aperture of the apertured member, at a time, intersecting a beam of light which was actually projected at an earlier time. The actual positions of the transmitted beam and projected aperture at an instant of time will be discussed hereinafter with reference to FIGS. 8*a* and 8*b*.

Since in FIG. 5 no target is within the area 77 a corresponding lack of return signal will produce an absence of a picture on the TV-monitor. At some time later in the scan, the scanning beam 72 at position B illuminates a target 80. Since the scanning projected aperture 57' "sees" the same portion of the target being illuminated, the reflected beam 72' will be accepted by the image dissector 20.

Since the scanning beam 72 and the scanning aperture 57' are scanned in synchronism, the acceptance region 77 from point 75 to 76 in actuality scans to define an acceptance field of view, or "range window", shown by the area 82. Otherwise stated, any target within the acceptance field of view 82 will be correspondingly portrayed on the TV-monitor since the image dissector 20 will see any reflected beam therefrom whereas any target outside of the acceptance field of view will not be seen. If a target is located within the vicinity of position C, it will not be seen in detail with the acceptance field of view as shown in FIG. 5. Any such target may block a scanning beam 72 or block a reflected beam 72' from a target behind it and such a situation will show up on the TV-monitor as a shadow; that is, the target at position C will be in outline only. In order to see the details of such a target the range window may be moved relative to the transmitter-receiver location such that the projected aperture and the scanning beam coincide on the target, and to this end reference should now be made to FIGS. 7*a* and 7*b*.

In FIG. 7a, there is shown the scanning beam 72 at the time of transmission and the projected aperture 57' at the time of reception, the combination defining an acceptance region 77. To see a target within the area designated C the relative angular position between the scanning beam and the projected aperture 57' is increased. In FIG. 1, positioning means 32 is included in order to move the acceptance area and consequently the acceptance field of view toward and away from the transmitter and receiver apparatus. FIG. 7b shows an acceptance area 87 closer to the transmitter receiver apparatus than the acceptance area of FIG. 7a. This movement may be effected by physically changing the angle between the transmitter 10 and the receiver 20 so that the aforementioned intersection occurs in the general ares of C.

Briefly summarizing therefore, the acceptance field of a view may be varied toward and away from the transmitter-receiver location by physically rotating either the transmitter 10, or the receiver 20, or both. As was stated, a second and another way to accomplish this same result is by electrically moving the raster 42 (FIG. 2) over a predetermined distance from its normal centered position on the tube face 41. A third method by which the acceptance area may be moved relative to the transmitter-receiver location is by a relative electrical movement of the aperture projection 57'. This effective movement of the aperture projection is accomplished by a desired advance or delay of the scanning to the projected image 70'' (FIG. 6a) and to this end reference should now be made to FIGS. 8a and 8b.

FIGS. 8a and 8b show the spot position at various points in time during the course of one line scan operation. The transmitter has been labeled T and the receiver has been labeled R. Two targets, target 1 and target 2 are pictured, with target 2 being at a greater distance from the transmitter-receiver location than target 1. In this respect, it is to be noted that various sizes and distances have not been drawn to exact scale. The transmitter T projects a flying spot of light towards a field of view. Let us assume that at some time, $t_0$ a spot of light was projected which hit target 1 at position $P_1$. The spot 93 therefore represents a spot which was projected at some earlier time and has hit the target at position $P_1$ at time $t_1$. At some time later, the reflection of spot 93 is returned, as represented by arrow 99, to the receiver R. During the time that it takes for the initial spot to travel to the target and its reflection to return to the receiver, the scanning beam has been continuously sweeping, such that when the receiver receives the reflection of spot 93 from $P_1$ the transmitter will have projected the spot 93 to position $P_2$ at time $t_4$, and which was projected at an earlier time, e.g. $t_3$, the action being represented by arrow 100. The action is summarized as follows:

$t_0$: scan begins and light is initially projected toward the target.

$t_1$: light projected at $t_0$ hits target 1 at $P_1$.

$t_4$: light projected at $t_3$ hits target 1 at $P_2$. Additionally, light spot 93 reflected from target 1 is picked up by receiver R. The time that it takes for the spot 93 at position $P_1$ to travel to position $P_2$ is labeled $\delta$. From the foregoing, it follows that if the transmitter beam starts its scan at $t_0$ the receiver scan may be delayed by an amount of time equal to $\delta+\gamma$, where $\gamma$ is equal to the time it takes for the spot to initially hit the target ($t_1 - t_0$). The receiver will then see the reflection of spot 93 and the subsequent reflections of spots from target 1 due to the continuous scanning. Otherwise stated, if the scanning beam is started at some time $t_0$ the receiver scanning may begin at time $t_4$ in order to visually portray target 1 at a distance from the transmitter-receiver location. By increasing the delay time, a target at a greater distance from the location may be visually portrayed such as in FIG. 8b.

The transmitter T at some time projects a spot of light which at a later time hits target 2 at position $P'_1$. This spot is represented by the numeral 96. At some time later, the spot 96 has scanned to position $P'_2$ with the distance $\delta'$ between the positions representing the time for the spot 96 to reflect back to the receiver R. Therefore if the receiver scan is delayed until the spot is at position $P'_2$, the receiver will start receiving reflected spot 96 and the subsequent spot reflections from target 2, to visually portray target 2. In FIG. 8b suppose that target 1 is interposed in the path of the scanning beam. From a time standpoint an initial spot of light shown as spot 96 on target 2 will have hit target 1 and will have decayed (since the spot has an extremely short persistence) by the time the reflected spot 96 reaches the receiver R. If target 1 happens to be backscatter-causing medium such as fog, the reflection therefrom representing backscatter illumination, will not be accepted by the receiver aperture and will therefore have no detrimental effect on the system. (It is to be noted however that a fog medium will cause some attenuation of the propagated and reflected scanning beam.) If in FIG. 8b it is desired to look at target 1 it is only necessary to vary the scanning delay to coincide with the situation as illustrated in FIG. 8a.

An adjustable time-delay means may be calibrated directly in feet (or meters, etc.) such that an operator of the system may select a predetermined distance to a desired field of view by this simple precalibrated adjustment. This allows not only a determination of target distance but it also allows a determination of distance between targets. Since FIGS. 8a and 8b have been drawn for purposes of illustration, the beam divergence and size of aperture projection have been neglected. In actuality and taking these into consideration, the target 1 of FIG. 8aand target 2 of 8b would encompass a distance or width equal to the depth of field of view of each set of circumstances.

In the various figures illustrating the embodiment of the present invention, the transmitter has been shown to be to the left of the receiver (looking from behind the transmitter and receiver towards the field of view to be scanned). This situation is illustrated in FIG. 9 with the transmitter T to the left of receiver R. FIG. 9 illustrates the condition at an instant of time wherein the transmitted beam 104 is at the position shown while the projected receiver aperture 105 is at the position shown, representing a time delay in order to look at an object at a specified distance as was explained with respect to FIGS. 8a and 8b. A situation thus presents itself in FIG. 9 wherein the beam 104 is scanning while the projected aperture 105 is lagging or is initially stationary and "waiting" (the time delay) for a return from a target at a preset distance. As the beam 104 scans it may hit a target or a fog medium fairly close to the transmitter-receiver location the reflections from which may arrive at the receiver at the same time as the reflection from the desired target since the beam 104 crosses the projected aperture 105. In that instance, the picture may be somewhat degraded. In order to avoid any possibility of this situation occurring the transmitter and receiver location could be altered so that at an instantaneous point in time the projected aperture 105 does not intersect the beam 104, at any time during the scanning operation.

FIG. 10 illustrates an altering of position of the transmitter and receiver wherein the receiver is placed to the left of the transmitter. The positions of the beam 104 and projected aperture 105 are identical to that shown in FIG. 9. With the receiver to the left of the transmitter, the beam 104 which scans from left to right facing the scene does not intercept the projected aperture and consequently light reflected from a target or fog medium close to the receiver-transmitter location will not be accepted by the receiver.

FIG. 10 illustrates the receiver and transmitter in a horizontal plane. Other arrangements wherein the transmitted beam 104 does not intersect the projected aperture 105 at an instant of time may be utilized. As an example, the transmitter and receiver may be arranged in a vertical plane with the receiver located above the transmitter which scans from top to bottom.

Accordingly, there has been provided an optical imaging system for viewing objects only within a predetermined range window or acceptance field of view, which field of view may be selectively varied. The system is relatively insensitive to any light emanating from without the acceptance field of view and consequently extraneous ambient and backscatter light has relatively little effect upon the final presentation of the field of view on a TV-monitor. By scanning the desired field of view with radiation in the invisible portion of the spectrum and providing a receiver responsive to that wavelength, an optical imaging system may be provided which is undetectable except for special apparatus. The system is particularly well adapted for seeing and ranging in the dark and at the same time being essentially jam-proof. The insensitivity to backscatter aspect makes the system desirable from underwater use on submarines.

Although the present invention has been described with a certain degree of particularity, it should be understood that the disclosure herein has been made by way of example and that modifications and variations of the present invention are made possible in the light of the above teachings.

We claim:

1. An electro-optical system comprising:
a cathode ray tube flying spot scanner transmitter means, at a location, for scanning a field of view with a flying spot of light, at a predetermined rate;
an image dissector receiver means at said location, including a substantially nonstorage-type photosensitive surface, an apertured member, and means for relatively scanning said apertured member across said photosensitive surface;
means for synchronizing the scanning rates of said transmitter means and said receiver means for relatively scanning said apertured member across said photosensitive surface at the same said predetermined rate; and
said receiver means being positioned relative to said transmitter means for intercepting any of said light reflected back from said field of view.

2. An electro-optical system comprising:
transmitter means at a location for scanning a distant field of view with a scanning beam of light, at a predetermined rate;
receiver means, at said location, including a photosensitive surface responsive to said light, an apertured member, and means for relatively scanning said apertured member across said photosensitive surface;
means for synchronizing the scanning rates of said transmitter means and said receiver means for relatively scanning said apertured member across said photosensitive surface at the same said predetermined rate;
said receiver means being positioned relative to said transmitter means such that a projection of the aperture of said apertured member at a time, onto said field of view intersects said beam of light projected at an earlier time, the area of intersection defining an acceptance field of view; and
means of varying the relative angular positioning between said beam of light and said projection of said aperture for varying the position of said acceptance field of view relative to said location.

3. An electro-optical system comprising:
transmitter means at a location for scanning a distant field of view with a scanning beam of light, at a predetermined rate;
receiver means at said location, including a photosensitive surface responsive to said light, an apertured member, and means for relatively scanning said apertured member across said photosensitive surface;
means for synchronizing the scanning rates of said transmitter means and said receiver means for relatively scanning said apertured member across said photosensitive surface at the same said predetermined rate;
said receiver means being positioned relative to said transmitter means such that a projection of the aperture of said apertured member at a time, onto said field of view intersects said beam of light projected at an earlier time, the area of intersection defining an acceptance field of view; and
means for varying the relative angular positioning between said beam of light and said projection of said aperture for varying the position of said acceptance field of view toward and away from said location.

4. An optical imaging system comprising:
a cathode ray tube, at a location, having a short persistence phosphor on the face thereof for emitting light of a predetermined wavelength;
means for scanning said phosphor with an electron beam to produce a flying spot of said light over a raster;
optical means for projecting said flying spot to scan s field of view;
an image dissector tube, at said photosensitive of the type wherein an electron image on a photosensitive surface is scanned across an apertured member;
optical means for focusing any of said light reflected from said field of view onto said photosensitive surface to form said electron image;
said electron image at any instant of time being smaller than the aperture of said apertured member;
said image dissector tube being positioned relative to said cathode ray tube such that said projected flying spot of light will intersect a projection of said aperture, onto said field of view, within first and second limits defining a range window; and
means for electrically displacing said raster to effectively move said range window relative to said location.

5. An optical imaging system comprising:
a cathode ray tube, at a location, having a short persistence phosphor on the face thereof for emitting light of a predetermined wavelength;
means for scanning said phosphor with an electron beam to produce a flying spot of said light over a raster; optical means for projecting said flying spot to scan a field of view;
an image dissector tube, at said location, of the type wherein an electron image on a photosensitive surface is scanned across an apertured member;
optical means for focusing any of said light reflected from said field of view onto said photosensitive surface to form said electron image;
said electron image at any instant of time being smaller than the aperture of said apertured member;
said image dissector tube being positioned relative to said cathode ray tube such that said projected flying spot of light will intersect a projection of said aperture, onto said field of view, within first and second limits defining a range window; and
time delay means for retarding the scanning of the electron image of said image dissector tube for a predetermined period of time.

6. An optical imaging system comprising:
a flying spot scanner transmitter, at a location, for scanning a field of view;
an image dissector receiver at said location being of the type wherein an electron image formed on a photosensitive surface is scanned across an apertured member;
photomultiplier means located behind said apertured member for developing an output signal proportional to the intensity of the electron image being scanned;
television monitor means responsive to said output signal for providing a visual display; and
synchronizing means commonly connected to said flying spot scanner transmitter and image dissector receiver for controlling the scanning rates thereof.

7. An optical imaging system comprising:
a cathode ray tube having a short persistence phosphor on the face thereof which will emit radiation when bombarded by an electron beam;
first means for scanning said phosphor with a pencil beam of electrons, at a predetermined rate, for producing a scanning spot of said radiation;
optical means positioned relative to said face for projecting said spot of radiation over a field of view;

a receiver located adjacent said cathode ray tube;

said receiver including a nonstorage type photosurface responsive to said radiation to form an electron image, and a plate member having an aperture therein;

optical means positioned relative to said receiver for focusing any reflected radiation from said field of view onto said photosurface;

second means for scanning said electron image across said aperture at said predetermined rate;

photomultiplier means positioned behind said aperture for developing an output signal proportional to the intensity of said electron image being scanned thereacross;

television monitor means including a scanning cathode ray beam, and responsive to said output signal for providing a visual display in accordance with said output signal; and synchronizer means commonly connected to said first means, said second means and said television monitor means for synchronizing the scanning rates of said scanning spot of radiation said electron image and said cathode ray beam.

8. A method of optical imaging and ranging comprising the steps of:

scanning a field of view with a flying spot of light, at a predetermined rate;

relatively scanning said same field of view with the aperture of an apertured member of an image dissector tube at said same predetermined rate; and time delaying said relative scanning by a precalculated amount so as to receive said light reflected back from different points in said field of view at distances proportional to said time delay.